US00RE41304E

(19) United States
(12) Reissued Patent
Matsuo et al.

(10) Patent Number: US RE41,304 E
(45) Date of Reissued Patent: May 4, 2010

(54) METHOD AND APPARATUS FOR POWER SUPPLY CAPABLE OF EFFECTIVELY REDUCING A POWER CONSUMPTION

(75) Inventors: Masahiro Matsuo, Tokyo (JP); Shohichi Nitta, Tokyo (JP)

(73) Assignee: Ricoh Company, Ltd., Tokyo (JP)

(21) Appl. No.: 11/390,535
(22) Filed: Mar. 28, 2006

Related U.S. Patent Documents

Reissue of:
(64) Patent No.: 6,713,992
Issued: Mar. 30, 2004
Appl. No.: 10/075,624
Filed: Feb. 15, 2002

(30) Foreign Application Priority Data

Feb. 15, 2001 (JP) ..... P2001-038394
Jun. 22, 2001 (JP) ..... P2001-189792

(51) Int. Cl.
*G05F 1/40* (2006.01)
G06F 1/32

(52) U.S. Cl. ..... 323/266; 307/43; 307/77; 363/65; 713/310; 713/323; 713/324

(58) Field of Classification Search ..... 323/223, 323/265, 266, 268, 282, 284; 713/300, 320, 713/323, 330, 340
See application file for complete search history.

(56) References Cited

U.S. PATENT DOCUMENTS

| | | | | | |
|---|---|---|---|---|---|
| 3,835,368 | A | * | 9/1974 | Williams | 323/351 |
| 5,070,294 | A | * | 12/1991 | Nochi | 323/267 |
| 5,179,508 | A | * | 1/1993 | Lange et al. | 363/16 |
| 5,864,221 | A | * | 1/1999 | Downs et al. | 320/134 |
| 6,011,322 | A | * | 1/2000 | Stumfall et al. | 307/43 |
| 6,374,127 | B1 | * | 4/2002 | Park | 455/572 |
| 6,388,432 | B2 | * | 5/2002 | Uchida | 323/266 |
| 6,424,128 | B1 | * | 7/2002 | Hiraki et al. | 323/268 |

* cited by examiner

*Primary Examiner*—Gary L Laxton
(74) *Attorney, Agent, or Firm*—Dickstein Shapiro LLP

(57) ABSTRACT

A power supply apparatus includes a DC-to-DC converter performing a voltage conversion converting a voltage of a source power supplied from a direct current power source to a first predetermined voltage lower than the voltage of the source power and a voltage regulator carrying out a voltage regulation for regulating the first predetermined voltage of the source power output from the DC-to-DC converter to at least a second predetermined voltage lower than the first predetermined voltage.

42 Claims, 9 Drawing Sheets

METHOD AND APPARATUS FOR POWER SUPPLY CAPABLE OF EFFECTIVELY REDUCING A POWER CONSUMPTION

Matter enclosed in heavy brackets [ ] appears in the original patent but forms no part of this reissue specification; matter printed in italics indicates the additions made by reissue.

FIELD OF THE INVENTION

This patent specification relates to a power supply method and apparatus, and more particularly to a power supply method and apparatus that effectively reduces power consumption.

BACKGROUND OF THE INVENTION

Conventionally, a power supply apparatus that reduces a direct current supplied from a direct current power source (e.g., a battery) to a predetermined voltage is classified into two types; one type using a voltage regulator and the other type using a DC-to-DC converter.

FIG. 1 shows an exemplary circuit of a background power supply apparatus using a voltage regulator 100. In the voltage regulator 100 of FIG. 1, a P-channel-type MOS (metal oxide semiconductor) transistor 102 (hereinafter referred to as a P-MOS transistor 102) and resisters 103 and 104 are connected in series between a power source terminal applied with a power source voltage VDD by a direct current 101 (e.g., a battery including a secondary battery) and ground. The resisters 103 and 104 divide a voltage Vout which is compared by a voltage comparator 106 with a predetermined reference voltage Vref generated by a reference voltage generator 105. Based on a comparison result, an operation of the P-MOS transistor 102 is controlled so that the voltage Vout is held at a desired value. In FIG. 1, a CPU 107 is an exemplary system that requires power from the voltage regulator 100.

However, the above-described voltage regulator has a drawback that the P-MOS transistor 101 consumes a great amount of electric power for a reduction of the power source voltage VDD to the voltage Vout. More specifically, when the CPU 107 consumes a current of 100 mA, for example, and a voltage regulator 100 reduces the power source voltage VDD from 3.6 volts, for example, to 2 volts, for example, the P-MOS transistor 101 consumes the power of 0.16 W. That is, the voltage regulator consumes a difference of the battery voltage and the CPU's operational voltage. Such voltage regulator is undesirable for a system aiming a low power consumption since the CPU's operational voltage has been lowered in the recent years.

Accordingly, as shown in FIG. 2, a DC-to-DC converter is used in place of the voltage regulator as a power supply in a system (e.g., the CPU 107) using a battery. In FIG. 2, a DC-to-DC converter 110 reduces the power source voltage VDD to a predetermined voltage Vout and supplies the voltage Vout to the CPU 107.

In general, a system using a battery as a source of power is provided with a sleep function or temporarily stopping the operations of the system to reduce an electrical power consumption on an as needed basis. In the case of the power supply apparatus of FIG. 2, it is attempted to reduce the power consumption by changing the output terminal of the DC-to-DC converter 110 to the CPU 107 in the sleep mode from a ground level to a high impedance level. This is because the DC-to-DC converter 110 is used as an apparatus that directly controls the power source required by the system (e.g., the CPU 107).

On the other hands, the DC-to-DC converter 110 is required to be always in an active state in the case the system (e.g., the CPU 107) in the sleep mode is intermittently activated to control certain components on an as needed basis. In such a case, the power consumption by the DC-to-DC converter 110 shares a large part of the total system power consumption.

SUMMARY OF THE INVENTION

This patent specification describes a novel power supply apparatus. In one example, this novel power supply apparatus includes a DC-to-DC converted and a voltage regulator. The DC-to-DC converter is arranged and configured to perform a voltage conversion for converting a voltage of a power source supplied from a direct current power source to a first predetermined voltage. The first predetermined voltage is lower than the voltage of the power source. The voltage regulator is arranged and configured to carrying out a voltage regulation for regulating the first predetermined voltage of the power source to at least a second predetermined voltage. The second predetermined voltage is lower than the first predetermined voltage.

The DC-to-DC converter may be turned into a non-active state to stop the voltage conversion and straight passes the voltage of the power source when an operation mode is changed to a sleep mode.

The DC-to-DC converter may include a switching circuit, a smoothing circuit, and a controller. The switching circuit is arranged and configured to perform a switching operation for switching the power source and to output a pulsating current voltage. The smoothing circuit is arranged and configured to smooth the pulsating current voltage output by the switching circuit and to output a smoothed voltage to the voltage regulator. The controller is arranged and configured to detect the smoothed voltage output from the smoothing circuit and to control the switching circuit to change a performance of the switching operation in response to a detection result of the smoothed voltage so that the smoothed voltage output by the smoothing circuit is substantially equal to the first predetermined voltage. The controller is turned into a non-active state to cause the switching circuit to stop the switching operation so as to pass the voltage of the power source through the switching circuit and to output the voltage of the power source to the smoothing circuit when the operation mode is changed to the sleep mode.

The DC-to-DC converter may output the voltage of the power source without performing the voltage conversion when the operation mode is changed to the sleep mode.

The converter may include a switching circuit, a smoothing circuit, and a controller. The switching circuit is arranged and configured to perform a switching operation for switching the power source and outputting a pulsating current voltage. The smoothing circuit is arranged and configured to smooth the pulsating current voltage output from the circuit and to output a smoothed voltage to the voltage regulator. The controller is arranged and configured to detect the smoothed voltage output from the smoothing circuit and to control the switching circuit to change a performance of the switching operation in response to a detection result of the smoothed voltage so that the smoothed voltage output from the smoothing circuit is substantially equal to the first predetermined voltage. The controller causes the switching circuit to stop the switching operation so as to pass the voltage of the power source through the switching circuit and to output the voltage of the power source to the smoothing circuit when the operation mode is changed to the sleep mode.

The controller may connect a load to an output terminal of the smoothing circuit and controls a current flowing the load so as to reduce the voltage output from the smoothing circuit to the first predetermined voltage when the voltage output from the smoothing circuit is lower than the first predetermined voltage and when the operation mode is changed to a normal operation mode.

The controller may include a transistor, a comparator, and a current control circuit. The transistor operates as the load. The comparator performs a first comparison for comparing the voltage output from the smoothing circuit with the first predetermined voltage when the operation mode is changed to the normal operation mode and outputs a first comparison result. The current control circuit is arranged and configured to control the transistor to produce a current flowing therethrough in response to the first comparison result of the comparator when the operation mode is changed to the normal operation mode.

The current control circuit may control the transistor to increase the current at a first predetermined pace when the voltage output from the smoothing circuit is determined as greater than the first predetermined voltage based on the first comparison result performed by the comparator.

The current control circuit may control the transistor to continue to increase the current at the first predetermined pace for a first predetermined time period when the voltage output from the smoothing circuit is determined as substantially equal to the first predetermined voltage based on the first comparison result performed by the comparator. The current control circuit may further control the transistor to produce a saturated current flowing therethrough for a second predetermined time period immediately after the first predetermined time period.

The current control circuit may control the transistor to decrease the current at a second predetermined pace for a third predetermined time period immediately after the second predetermined time period.

The controller may detect a current output from the switching circuit and controls the switching circuit to vary the current in response to the detected current when the operation mode is changed to the sleep mode.

The controller may control the switching circuit to straight output the voltage of the power source to the smoothing circuit when the current detected is smaller than a predetermined value and to reduce the current output therefrom to a value smaller than the predetermined value in a predetermined manner when the current is greater than the predetermined value.

The controller may perform a second comparison between a reference voltage dropping at a substantially constant pace and the voltage output from the smoothing circuit in response to the detected voltage when the operation mode is changed to the normal operation mode, and controls a duty cycle of the switching operation performed by the switching circuit according to a result of the second comparison during a time the voltage output from the smoothing circuit is reduced to the first predetermined voltage.

The controller may perform a third comparison between another predetermined reference voltage and the voltage output from the smoothing circuit in response to the detected voltage, and controls a duty cycle of the switching operation performed by the switching circuit according to a result of the third comparison when the voltage output from the smoothing circuit is reduced to the first predetermined voltage.

This patent specification further describes a novel method of power supply. In one example, this novel method includes the steps of performing and regulating. The performing step performs a DC-to-DC conversion with a DC-to-DC converter to achieve a voltage conversion for converting a voltage of a power source supplied from a direct current power source to a first predetermined voltage. The first predetermined voltage is lower than the voltage of the power source. The regulating step regulates the first predetermined voltage of the power source to at least a second predetermined voltage. The second predetermined voltage is lower than the first predetermined voltage.

The performing step may turn the DC-to-DC converter into a non-active state to stop the DC-to-DC conversion and straight passes the voltage of the power source through the DC-to-DC converter to the voltage regulator when an operation mode is changed to a sleep mode.

The performing step may include the steps of executing, smoothing, detecting, changing, and stopping. The executing step executes a switching operation for switching the power source to output a pulsating current voltage. The smoothing step smoothes the pulsating current voltage output by the switching circuit to output a smoothed voltage to the voltage regulator. The detecting step detects the smoothed voltage output in the smoothing step. The changing step changes a performance of the switching operation in response to a detection result of the smoothed voltage so that the smoothed voltage output in the smoothing step is substantially equal to the first predetermined voltage. The stopping step stops the switching operation when the operation mode is changed to the sleep mode so as to apply the voltage of the power source to the smoothing circuit.

The DC-to-DC converted may output the voltage of the power source without performing the voltage conversion when the operation mode is changed to the sleep mode.

The performing step may include the steps of executing, smoothing, detecting, changing, and stopping. The executing step executes a switching operation for switching the power source to output a pulsating current voltage. The smoothing step smoothes the pulsating current voltage output in the switching step to output a smoothed voltage to the voltage regulator. The detecting step detects the smoothed voltage output to the smoothing step. The changing step changes a performance of the switching operation in response to a detection result of the smoothed voltage so that the smoothed voltage output in the smoothing step is substantially equal to the first predetermined voltage. The stopping step stops the switching operation when the operation mode is changed to the sleep mode so as to apply the voltage of the power source to the smoothing circuit.

The above-mentioned novel method may further includes steps of providing, applying, and adjusting. The providing step provides a transistor as a load. The applying step applies the voltage output in the smoothing step to the transistor so that a current flows through the transistor when the voltage output in the smoothing step is lower than the first predetermined voltage and when the operation mode is changed to a normal operation mode. The adjusting step adjusts the current flowing the load so as to reduce the voltage output in the smoothing step to the first predetermined voltage.

The adjusting step may include the steps of performing and causing. The performing step performs a first comparison for comparing the voltage output in the smoothing step with the first predetermined voltage when the operation mode is changed to the normal operation mode to output a first comparison result. The causing step causes the transistor to produce a current flowing therethrough in response to the first comparison result of the comparing step when the operation mode is changed to the normal operation mode.

The causing step may cause the transistor to increase the current at a first predetermined pace when the voltage output in the smoothing step is determined as greater than the first predetermined voltage based on the first comparison result performed in the comparing step.

The causing step may cause the transistor to continue to increase the current at the first predetermined pace for a first predetermined time period when the voltage output in the smoothing step is determined as substantially equal to the first predetermined voltage based on the first comparison result performed in the comparing step, and may cause the transistor to produce a saturated current flowing therethrough for a second predetermined time period immediately after the first predetermined time period.

The causing step may cause the transistor to decrease the current at a second predetermined pace for a third predetermined time period immediately after the second predetermined time period.

The above-mentioned method may further include the steps of detecting and instructing. The detecting step detect a current output in the switching step when the operation mode is changed to the sleep mode. The instructing step instruct the switching step to change the current in response to the detected current.

The instructing step may instruct the switching step to straight output the voltage of the power source to the smoothing step when the current detected is smaller than a predetermined value and to reduce the current output in the switching step to a value smaller than the predetermined value in a predetermined manner when the current is greater than the predetermined value.

The novel method may further include the steps of performing and determining. The performing step performs a second comparison between a reference voltage dropping at a substantially constant pace and the voltage output in the smoothing step in response to the detected voltage during a time the voltage output in the smoothing step is reduced to the first predetermined voltage. The determining step determines a duty cycle of the switching operation performed in the switching step according to a result of the second comparison.

The above-mentioned novel method may further include the steps of performing and controlling. The performing step performs a third comparison between another predetermined reference voltage and the voltage output in the smoothing circuit in response to the detected voltage. The controlling step controls the duty cycle of the switching operation performed in the switching step according to a result of the third comparison when the voltage output in the smoothing step is reduced to the first predetermined voltage.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
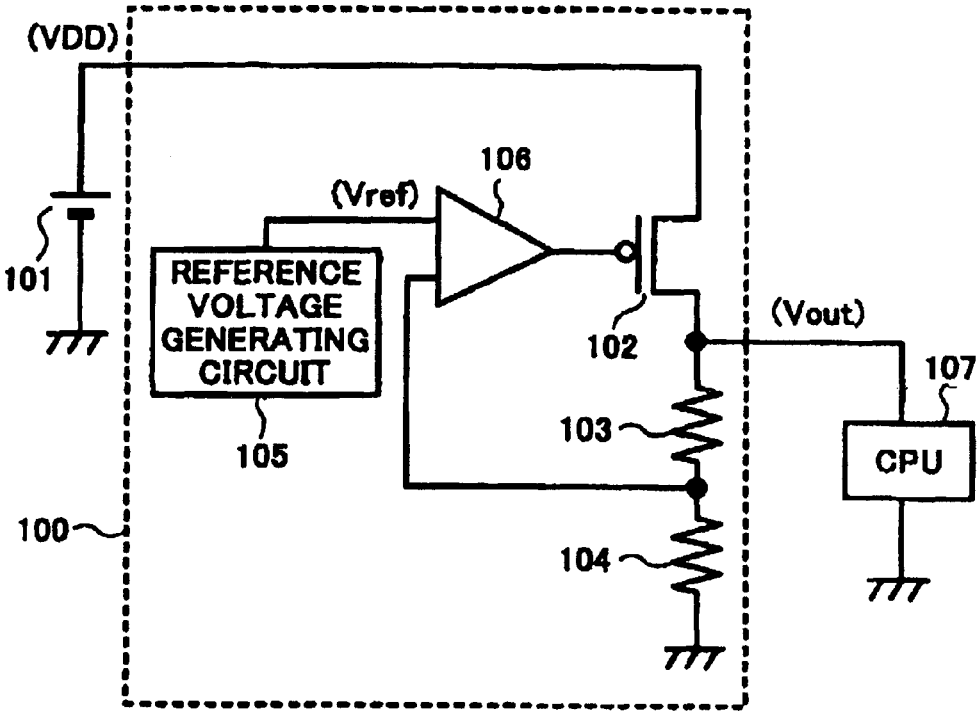
FIG. 1 PRIOR ART
FIG. 1 is a block diagram of a background power supply apparatus.
Figure 2:
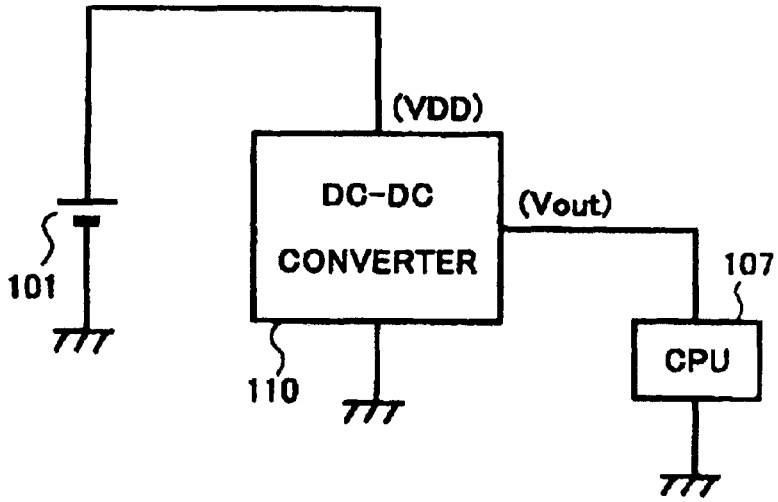
FIG. 2 PRIOR ART
FIG. 2 is a block diagram of another background power supply apparatus.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Figure 3:
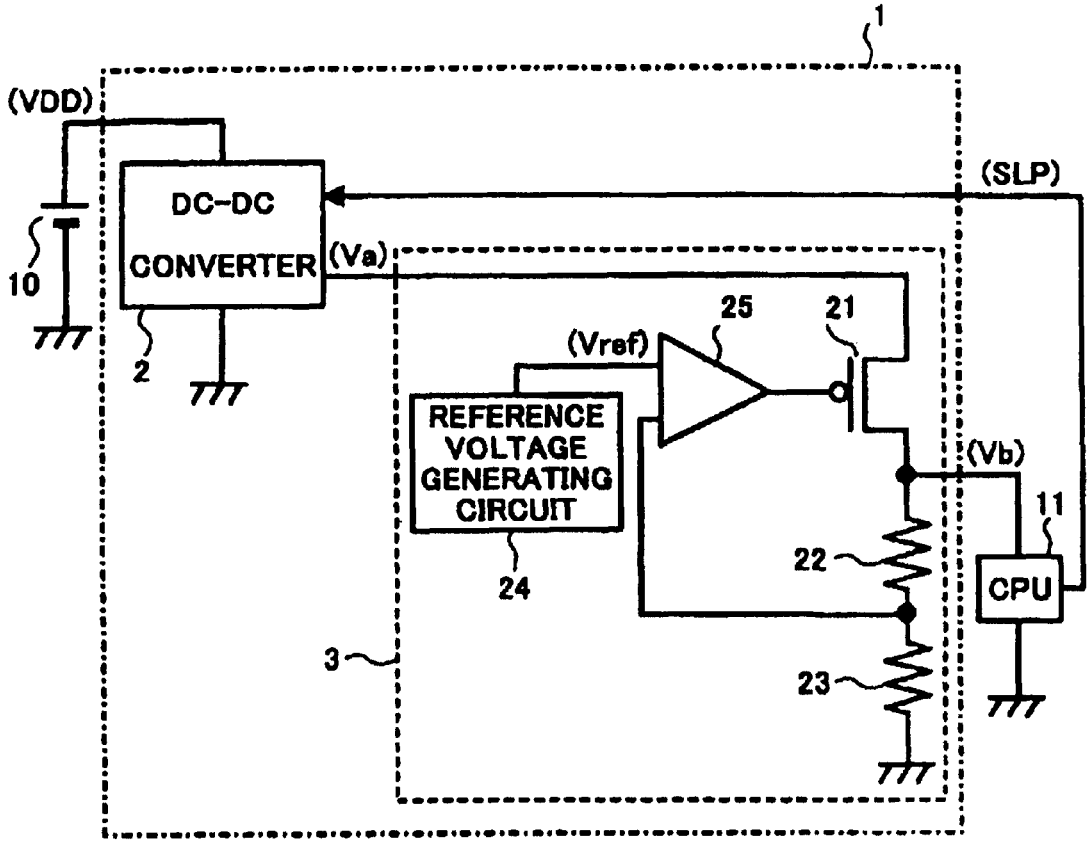
FIG. 3 is a block diagram of a power supply apparatus including a DC-to-DC converter according to a preferred embodiment.

Referring now to the drawings, wherein like reference numerals designate identical or corresponding parts throughout the several views, and more particularly to FIG. 3 thereof, a power supply apparatus 1 according to a preferred embodiment is described. As illustrated in FIG. 3, the power supply apparatus 1 includes a DC-to-DC (direct current to direct current) converter 2, and a voltage regulator 3. The DC-to-DC converter 2 reduces a power source voltage VDD to a predetermined voltage Va and has an output terminal outputting the voltage Va. The power source voltage VDD is supplied from a direct current power source 10 that can be composed of various kinds of batteries including secondary batteries. The voltage regulator 3 reduces the predetermined voltage Va output from the DC-to-DC converter 2 to a predetermined voltage Vb and has an output terminal outputting the voltage Vb.

As shown in FIG. 3, in the power supply apparatus 1, the DC-to-DC converter 2 is connected between the power supply line from the current power source 10 and ground. The voltage regulator 3 is connected between the output terminal of the DC-to-DC converter 2 and ground. The output terminal of the voltage regulator 3 is connected to a power supply terminal of a CPU (central processing unit) 11. The CPU 11 is shown as an exemplary device requiring a power supply. Other devices such as a DSP (digital signal processor), memories, and so on which form, together with the CPU 11, a system apparatus also require a power supply.

The voltage regulator 3 includes a P-channel-type MOS (metal oxide semiconductor) transistor 21 (hereinafter referred to as a P-MOS transistor 21), resisters 22 and 23, a reference voltage generator 24, and a voltage comparator 25. The P-MOS transistor 21 and the resisters 22 and 23 are connected in series between the output terminal of the DC-to-DC converter 2 and ground, and the voltage regulator 3 has an output terminal drawn from a line connecting the P-MOS transistor 21 to the resister 22. The voltage comparator 25 has an input terminal connected to a line placed between the resisters 22 and 23 and another input terminal to receive a reference voltage Vref output from the reference voltage generator 24. The voltage comparator 25 has an output terminal connected to a gate of the P-MOS transistor 21.

The resisters 22 and 23 divide the voltage Vb, and the voltage comparator 25 compares the voltage divided by the resisters 22 and 23 to the reference voltage Vref output from the reference voltage generator 24. When the divided, voltage is equal to or greater than the reference voltage Vref, the voltage comparator 25 controls the operation of the P-MOS transistor 21 so that the current flowing through the P-MOS transistor 21 is reduced. On the other hands, when the divided voltage is smaller than the reference voltage Vref, the voltage comparator 25 controls the P-MOS transistor 21 to increase the flowing current.

The CPU 11 has a sleep function for turning the connected system apparatus into a low power consuming state (hereinafter referred to as a sleep mode) by temporarily stopping operations of the associated components. To turn into the sleep mode, the CPU 11 sends a sleep signal SLP to the DC-to-DC converter 2. In a normal operation mode, that is, not in the sleep mode, no sleep signal SLP is sent to the DC-to-DC converter 2 from the CPU 11 and the DC-to-DC converter 2 generates the voltage Va by reducing the power source voltage VDD supplied by the direct current power source 10 and outputs the voltage Va to the voltage regulator 3.

The voltage regulator 3 reduces the voltage Va applied as a power source by the DC-to-DC converter 2 to obtain the voltage Vb and supplies the voltage Vb to the CPU 11 as a power source. In this way, the power supply apparatus 1 reduces the power source voltage VDD supplied by the direct current power source 10 to the voltage Va with the DC-to-DC converter 2, further reduces the voltage Va to the voltage Vb with the voltage regulator 3, and supplies the voltage Vb as a power source to the CPU 11. With this configuration, it is possible to minimize a value of voltage that the voltage regulator 3 bears to reduce as a load. When the power source voltage VDD is 3.6 volts, for example, the voltage Va output by the DC-to-DC converter 2 may be set to 2.0 volts, for example, and the voltage Vb output by the voltage regulator 3 may be set to 1.8 volts, for example. Thus, the power consumption of the voltage regulator 3 can be reduced.

In the sleep mode, that is, during the time the DC-to-DC converter 2 receives the sleep signal from the CPU 11, the DC-to-DC converter 2 is put into an inactive status to stop its operation. When stopping the operation, the DC-to-DC converter 2 outputs the power source voltage VDD supplied by the direct current power source 10 straight as the voltage Va without performing the voltage reduction. Accordingly, the power source voltage VDD is applied as a power source to the voltage regulator 3. At this time, however, the CPU 11 operates in the sleep mode and consumes almost no electric power. Therefore, the voltage regulator 3 consumes almost no electric power.

On the other hands, the CPU 11 may perform its operation at intervals of a relatively short time period (e.g., 1 second) during the sleep mode. In such an operation mode at intervals, the voltage regulator 3 reduces the power source voltage VDD applied thereto through the DC-to-DC converter 2 to the voltage Vb, thereby obtaining a power source required for the CPU 11 to operate. At this time, the electric power consumed by the CPU 11 is relatively small and therefore the P-MOS transistor 21 of the voltage regulator 3 consumes a relatively small amount of electric power.

Figure 4:
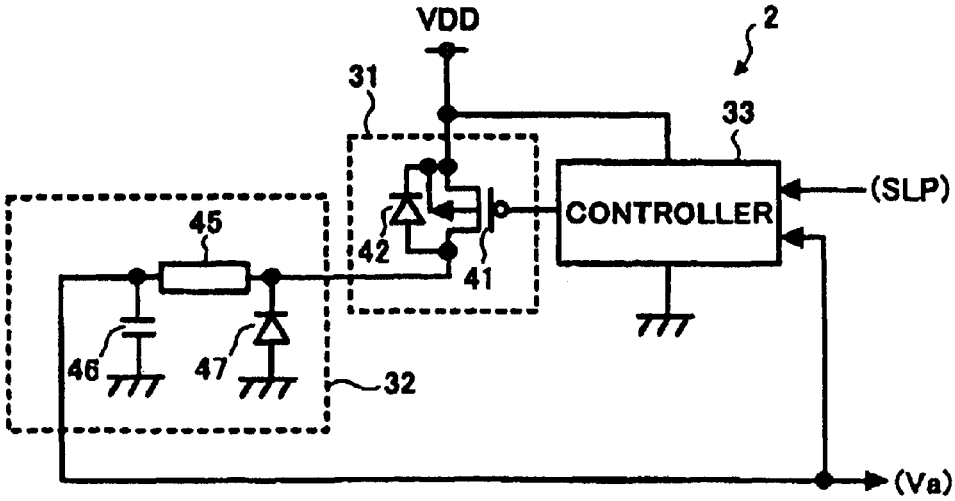
FIG. 4 is a circuit diagram of the DC-to-DC converter.

FIG. 4 illustrates an exemplary internal structure of the DC-to-DC converter 2. As illustrated in FIG. 4, the DC-to-DC converter 2 includes a switching circuit 31, a smoothing circuit 32, and a controller 33. The switching circuit 31 switches the power source voltage VDD supplied by the direct current power source 10 and outputs a resultant pulsating current voltage. The smoothing circuit 32 smoothes the pulsating current voltage output by the switching circuit 31. The controller 33 controls the switching operation of the switching circuit 31.

The switching circuit 31 includes a P-MOS transistor 41 and a parasite diode connected between a drain and a source of the P-MOS transistor 41. In the P-MOS transistor 41, the source is applied with the power source voltage VDD from the direct current power source 10, a gate is connected to the controller 33, and the drain is connected to the smoothing circuit 32. A substrate gate of the P-MOS transistor 41 is connected to the source thereof.

The smoothing circuit 32 includes a smoothing choke coil 45, a smoothing capacitor 46, and a flywheel diode 47. The smoothing choke coil 45 and the smoothing capacitor 46 form a choke input type smoothing circuit that smoothes the pulsating current voltage input from the P-MOS transistor 41 and outputs a resultant voltage. The flywheel diode 47 has a cathode connected to an input terminal of the smoothing choke coil 45 and an anode connected to ground.

The direct current smoothed through the smoothing circuit 32 is output to the voltage regulator 3 as the voltage Va, as well as to the controller 33. The controller 33 outputs a pulse signal having a predetermined frequency (e.g., in a range from several hundreds kHz to one MHz) to the gate of the P-MOS transistor 41 when receiving no input of the predetermined sleep signal SLP from the CPU 11).

The controller 33 observes the voltage output from the smoothing circuit 32 and controls a duty cycle of the pulse signal output to the gate of the P-MOS transistor 41 so that the voltage output from the smoothing circuit 32 is equal to the predetermined voltage Va (e.g., 2.0 volts). More specifically, the controller 33 reduces the duty cycle so that the P-MOS transistor 41 turns on for a relatively longer time period when the voltage output from the smoothing circuit 32 is smaller than the predetermined voltage Va. Also, the controller 33 increases the duty cycle so that the P-MOS transistor 41 turns on for a relatively shorter time period when the voltage output from the smoothing circuit 32 is greater than the predetermined voltage Va. Further, the controller 33 maintains the duty cycle when the voltage output from the smoothing circuit 32 is equal to the predetermined voltage Va.

On the other hands, the controller 33 is turned into a non-active state and stops its operation when receiving the predetermined sleep signal SLP from the CPU 11, and an input to the gate of the P-MOS transistor 41 is at a low level. Thereby, the P-MOS transistor 41 is turned into an on state, and the voltage output from the smoothing circuit 32 is equal to the power source voltage VDD supplied by the direct current power source 10.

The above-described power supply apparatus 1 has the voltage regulator 3 configured to output a single voltage Vb.

Alternatively, the above-described power supply apparatus 1 may have the voltage regulator 3 outputting a plurality of different voltages. Also, the switching circuit 31 and the controller 33 of the DC-to-DC converter 2 and the voltage regulator 3 can be integrated into a single IC chip.

Figure 5:
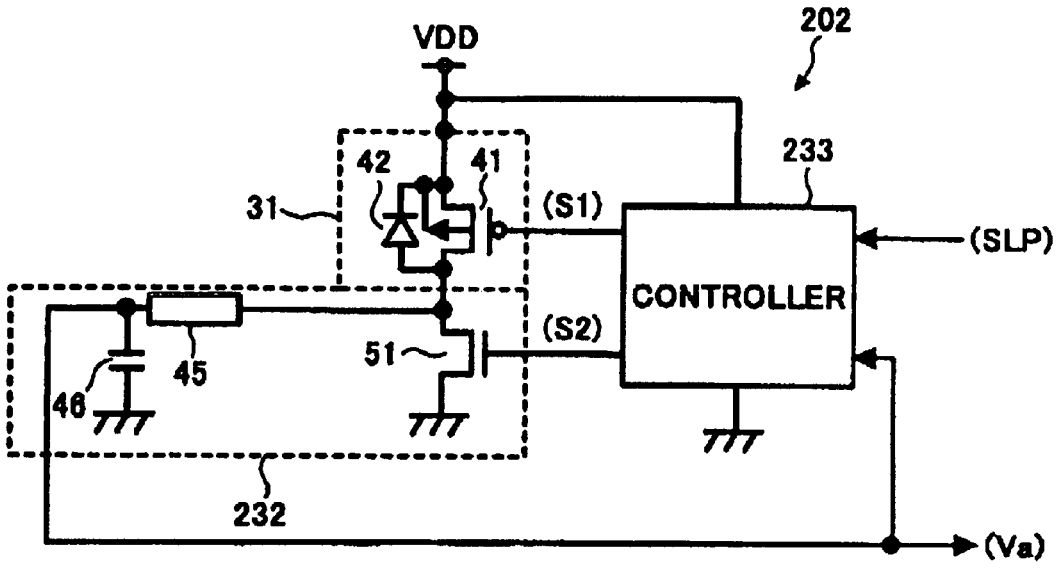
FIG. 5 is a circuit diagram of another DC-to-DC converter according to a preferred embodiment.

FIG. 5 shows a DC-to-DC converter 202 which can be used as an alternative to the DC-to-DC converter 2. The DC-to-DC converter 202 of FIG. 5 is similar to the DC-to-DC converter 2 of FIG. 4, except for a smoothing circuit 232 and a controller 233. The smoothing circuit 232 includes a high active N-channel-type MOS (metal oxide semiconductor) transistor 51 (hereinafter referred to as a N-MOS transistor 51) in place of the-flywheel-diode 47 of th smoothing circuit 32. The controller 233 of FIG. 5 is similar to the controller 33 of FIG. 4, except for generation of control signals S1 and S2. In the DC-to-DC converter 202, the N-MOS transistor 51 is connected between the drain of the P-MOS transistor 41 and ground, as shown in FIG. 5, so that the P-MOS transistor 41 and the N-MOS transistor 51 are controlled by the controller 233 with the control signals S1 and S2.

Figure 6:
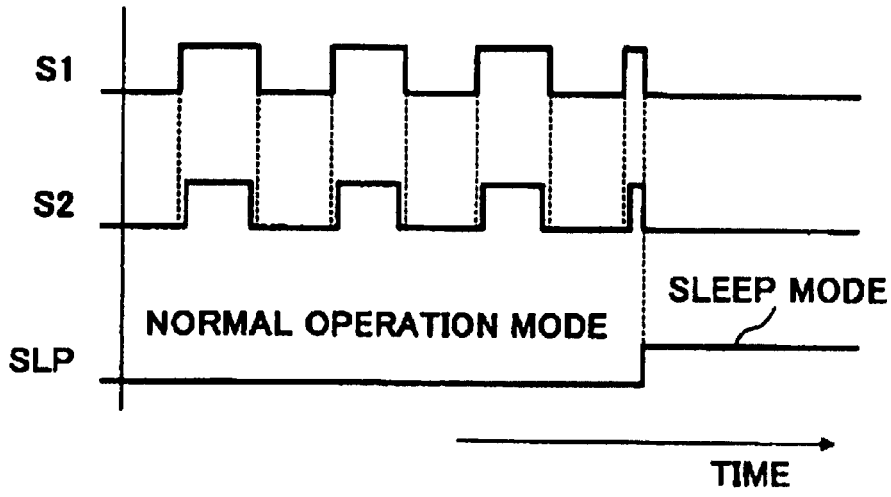
FIG. 6 is a time chart for explaining control signals of a controller included in the DC-to-DC converter of FIG. 5.

A time chart of FIG. 6 shows a relationship between the control signals S2 and S2. A shown in FIG. 6, the sleep signal SLP output by the CPU 11 is held at a low level during the normal operation mode and at a high level during the sleep mode. During the normal operation mode, the controller 233 generates the control signals S1 and S2 which rise and fall differently from each other and sends them to the P-MOS transistor 41 and the N-MOS transistor 51, respectively. Thereby, the P-MOS transistor 41 and the N-MOS transistor 51 are controlled so as not to be turned on at the same time. This N-MOS transistor 51 can be integrated with the switching circuit 31, the controller 233, and the voltage regulator 3 into a single IC chip.

In this way, the power supply apparatus 1 generates and supplies the stable predetermined voltage Vb to the CPU 11 during the time the CPU 11 operates in the normal operation mode by efficiently reducing the power source voltage VDD to the voltage Va with the DC-to-DC converter 202 and finally regulating the voltage Va with the voltage regulator 3 to obtain the voltage Vb. Thereby, the power supply apparatus 1 can achieve a relatively low power consumption of the voltage regulator 3 in the normal operation mode. Also, during the sleep mode, the power supply apparatus 1 causes the DC-to-DC converter 202 to turn into an inactive state to reduce the power consumption, and generates the predetermined stable Vb by reducing the power source voltage VDD to the voltage Vb directly with the voltage regulator 3. That is, since devices including the CPU, the DSP, memories, etc. are turned into the sleep mode and do not need the power source, the voltage Vb is not used by the devices and no power is consumed. When the CPU 11, for example, operates at intervals of a predetermined time period (e.g., one second) in the sleep mode, the CPU 11 can operate with the stable voltage Vb supplied.

Figure 7:
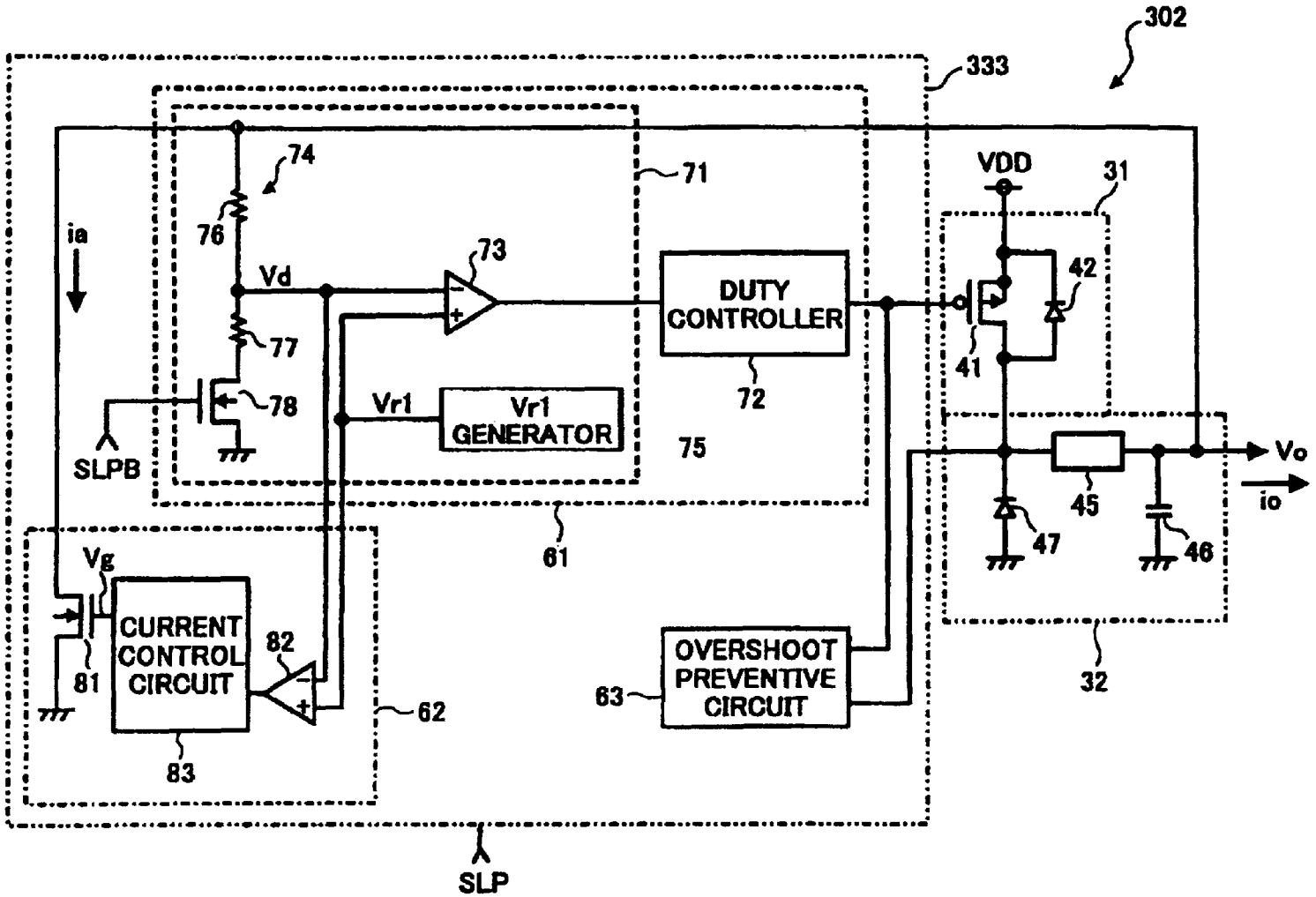
FIG. 7 is a circuit diagram of another DC-to-DC converter according to a preferred embodiment.

FIG. 7 shows a DC-to-DC converter 302 according to another preferred embodiment. The DC-to-DC converter 302 can be used as an alternative to the DC-to-DC converter 2 of FIG. 4 and is similar to it, except for a control circuit 333. This control circuit 333 can be used in place of the control circuit 233 of the DC-to-DC converter 202, as a further alternative.

As shown in FIG. 7, the control circuit 333 includes a duty control circuit 61, an undershoot preventive circuit 62, and an overshoot preventive circuit 63. The duty control circuit 61 controls a duty cycle of a pulse signal output to the gate of the P-MOS transistor 41 so that a voltage Vo output from the smoothing circuit 32 becomes the predetermined voltage Va. The undershoot preventive circuit 62 and the overshoot preventive circuit 63 operate to protect occurrences of an undershoot and an overshoot, respectively, of the voltage Vo. Connections of the sleep signal SLP to the duty control circuit 61, the undershoot preventive circuit 62, and the overshoot preventive circuit 63 are not shown in FIG. 7, for the sake of simplicity.

Figure 8:
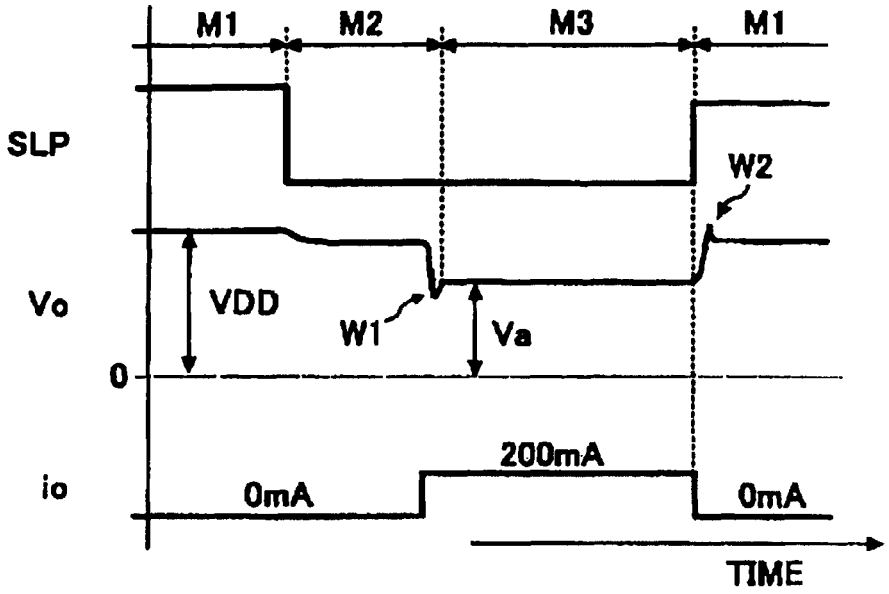
FIG. 8 is a time chart for explaining an undershoot and an overshoot of an output voltage Vo.

Referring to FIG. 8, mechanisms causing undershooting and overshooting waveforms are explained. In the sleep mode, the input to the gate of P-MOS transistor 41 is at a low level and the power source voltage VDD passes through the switching circuit 31 and the smoothing circuit 32 so that the voltage Vo has the same voltage level as the power source voltage VDD, as described above. When the sleep mode (referred to as M1 in FIG. 8) is changed to the normal operation mode (referred to as M2 in FIG. 8), the voltage regulator 3 needs a certain time period as a transition time (referred to as M3 in FIG. 8) to respond to the mode change. Accordingly, during the transition time the voltage Vo is maintained at a voltage level around the power source voltage VDD, which is greater than the predetermined voltage Va, for the above-mentioned certain time after the sleep mode is terminated. This causes the controller 333 to rise the voltage to a high level input to the gate of the P-MOS transistor 41 so that the P-MOS transistor 41 is turned off and shuts off the power source voltage VDD.

That is, at the end of the transition time, the voltage regulator 3 starts its operation under the condition that the voltage Vo is maintained at a voltage level around the power source Voltage VDD. This causes the DC-to-DC converter 302 to fall to a state of being loaded by the voltage regulator 3. In this case, when a load current lo (e.g., 200 mA) flows from the smoothing circuit 32, the voltage Vo may be dropped so rapidly as to produce an undershooting waveform W1, as shown in FIG. 8. As a result, the voltage Vo is momentarily reduced to a value considerably smaller than the predetermined voltage Va.

On-the other-hands, the voltage Vo may rise to rapidly so to produce an overshooting waveform W2, as shown in FIG. 8, when the P-MOS transistor 41 is turned on immediately after the mode is changed from the normal operation mode to the sleep mode in order to cause the power source voltage VDD to pass through the P-MOS transistor 41. In this case, the voltage Vo may produce an overshooting waveform W2, as shown in FIG. 8 and is momentarily risen over a value considerably greater than the power source voltage VDD.

The undershoot preventive circuit 62 prevents an occurrence of the above-described undershooting waveform W1 and the overshoot preventive circuit 63 prevents an occurrence of the above-described overshooting waveform W2.

The duty control circuit 61 includes a voltage detection circuit 71 and a duty controller 72. The voltage detection circuit 71 detects the voltage Vo, and the duty controller 72 controls a duty cycle of a pulse signal input to the gate of the P-MOS transistor 41 in response to the voltage Vo detected by the voltage detection circuit 71. The voltage detection circuit 71 includes an operational amplifier 73, a voltage dividing circuit 74, a Vr1 generator 75. The voltage dividing circuit 74 divides the voltage Vo, and includes resisters 76 and 77 and an N-channel-type MOS (metal oxide semiconductor) transistor 78 (hereinafter referred to as an N-MOS transistor 78). The Vr1 generator 75 generates a reference voltage Vr1. The resisters 76 and 77 are connected in series between the line of the voltage Vo and ground. The N-MOS transistor 78 has a gate that receives an inverse sleep signal SLPB (not shown) generated by the inverse of the sleep signal SLP.

In the voltage detection circuit 71, the sleep signal SLP is in a low state in the sleep mode and therefore the inverse sleep signal SLPB input to the gate of the N-MOS transistor 78 is in a high state. Thereby, the N-MOS transistor 78 is turned on and is brought into conduction. The voltage Vo is then divided by the resisters 76 and 77 and a divided voltage Vd is generated between the resisters 76 and 77. The operational amplifier 73 has an inverse input terminal receiving the divided voltage Vd and a non-inverse input terminal receiving the reference voltage Vr1 output from the Vr1 generator 75. The operational amplifier 73 compares the divided voltage Vd to the reference voltage Vr1 and outputs a voltage to the duty controller 72 in response to the comparison result. The duty controller 72 generates a pulse signal having a duty cycle in response to the voltage received from the operational amplifier 73 and outputs the pulse signal to the gate of the P-MOS transistor 41.

On the other hands, when the mode is changed from the normal operation mode to the sleep mode, the sleep signal SLP in a high state is output from the CPU 11. Accordingly, the operational amplifier 73, the Vr1 generator 75, and the duty controller 72 are caused to stop the respective operations. At the same time, in the voltage dividing circuit 74, the gate of the N-MOS transistor 78 is turned off and is out of conduction. As a result, the voltage Vo is divided and the divided voltage Vd is generated. When the duty controller 72 stops its operation, the output terminal thereof is in an open state and in a high impedance state.

The undershoot preventive circuit 62 includes an N-channel-type MOS (metal oxide semiconductor) transistor 81 (hereinafter referred to as an N-MOS transistor 81), an operations amplifier 83, and a current control circuit 83. The N-MOS transistor 81 operates as a load to consume a current Ia flowing from the output terminal of the smoothing circuit 32 to ground. The operational amplifier 82 operates as a voltage comparator for comparing the divided voltage Vd output from the voltage dividing circuit 74 to the reference voltage Vr1 output from the Vr1 generator 75, and outputs a binary signal in response to the comparison result. The undershoot preventive circuit 62 further includes a current control circuit 83. The current control circuit 83 controls the operation of the N-MOS transistor 81 in accordance with the signal output from the operational amplifier 82 so as to control the current Ia flowing from the output terminal of the smoothing circuit 32. The operational amplifier 82 the voltage dividing circuit 74, and the Vr1 generator 75 together form a voltage determination circuit.

In the undershoot preventive circuit 62, when the mode is changed from the normal operation mode to the sleep mode, the sleep signal SLP in a high state is output from the CPU 11. Accordingly, the operational amplifier 82 and the current control circuit 83 are caused to stop the respective operations and, at the same time, the gate of the N-MOS transistor 81 is turned off and is out of conduction. Since the P-MOS transistor 41 is in an on state and is conducting, the voltage Vo is held at a level around the power source voltage VDD.

When the mode is changed from the sleep mode to the normal operation mode, the operational amplifier 82 and the current control circuit 83 are turned into an active state and start the respective operations. At this time, the voltage Vo has a voltage close to the power source voltage VDD which is greater than the predetermined voltage Va and therefore the controller 333 outputs the voltage in a high state which turns off the P-MOS transistor 41. Therefore, the divided voltage Vd is greater than the reference voltage Vr1 and the operational amplifier 82 outputs a signal in a low state.

Figure 9:
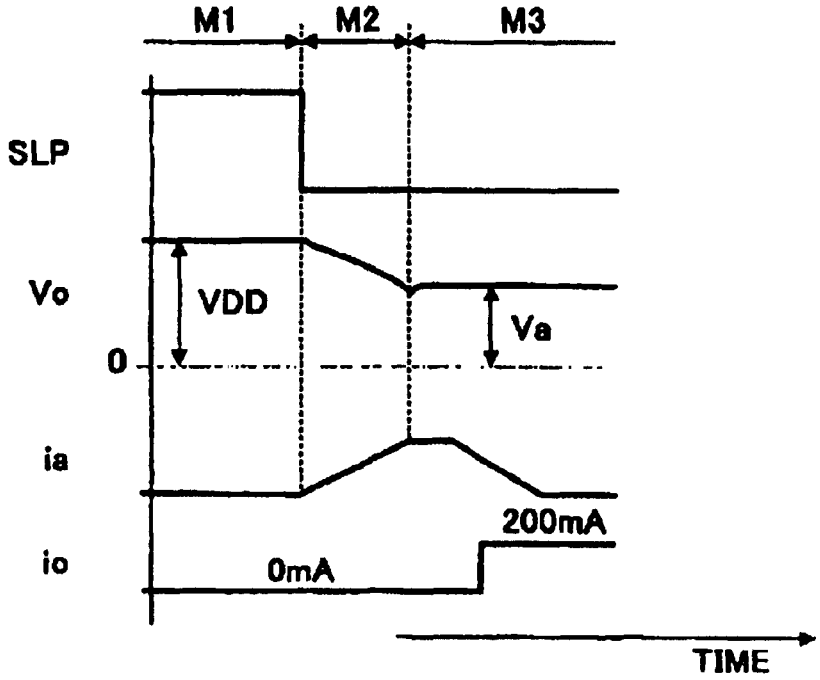
FIG. 9 is a time chart for showing an example of a current Ia flowing through an N-MOS transistor of an undershooting preventive circuit included in the DC-to-DC converter of FIG. 7.

When the low signal is input from the operational amplifier 82 to the current control circuit 83, the current control circuit 83 raises a gate voltage Vg of the N-MOS transistor 81. As a result, the N-MOS transistor 81 generate the current Ia in response to the gate voltage Vg input, as shown in FIG. 9. The voltage Vd is gradually reduced from the level of the power source voltage VDD to the predetermined voltage Va. During this reduction of the voltage Vd, the operational amplifier 82 changes the output from the low voltage to a high level voltage when the divided voltage Vd is reduced to a level smaller than the reference voltage Vr1.

Figure 10:
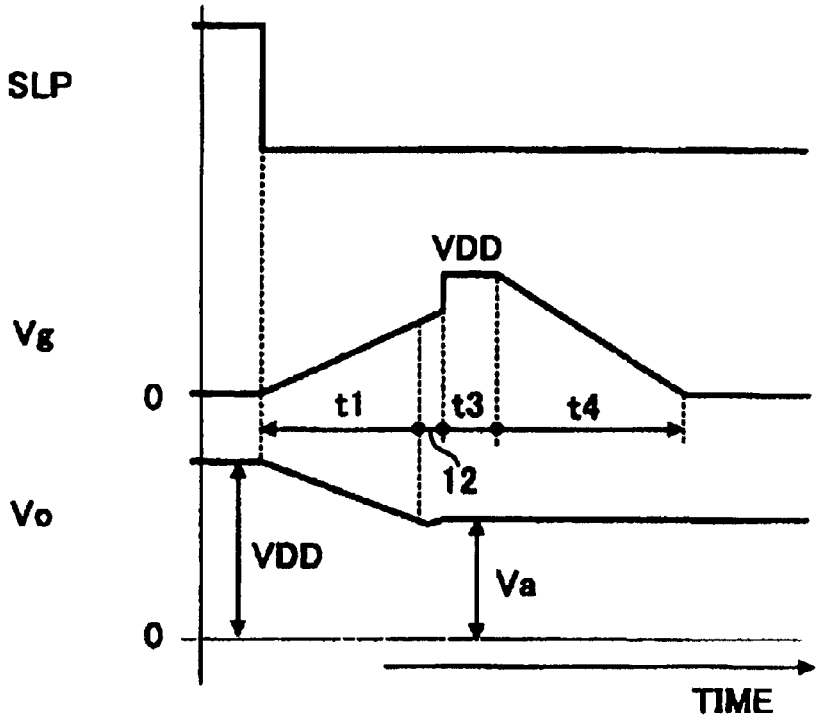
FIG. 10 is a time chart for showing an example of a gate voltage Vg relative to the N-MOS transistor of the undershooting preventive circuit.

When the operational amplifier 82 outputs a high signal to the current control circuit 83, the current control circuit 83 controls the gate voltage Vg of the N-MOS transistor 81 in a way as shown in FIG. 10. That is, the gate voltage Vg is linearly raised during a predetermined time t1 and is continuously raised during a predetermined time t2. Further, the gate voltage Vg is held at a level of the power source voltage VDD during a predetermined time t3 and is reduced from the level of the voltage Vg to ground level during a predetermined time t4. During these operations, the current Ia flowing through the N-MOS transistor 81 is changed in a way as shown in FIG. 9. The current during the predetermined time t3 is a saturated current. Also, during these operations, the voltage level of the gate voltage Vg is changed in a way as shown in FIG. 10. The gate voltage Vg is continuously raised in the predetermined time t2 at the same voltage raising pace as in a predetermined time t1 after the predetermined time t1, as shown in FIG. 10. This is because the duty control circuit 72 takes a certain delay time before starting the control of the operation of the P-MOS transistor 41 after the voltage level of the voltage Vo is changed to the predetermined voltage Va.

Figure 11:
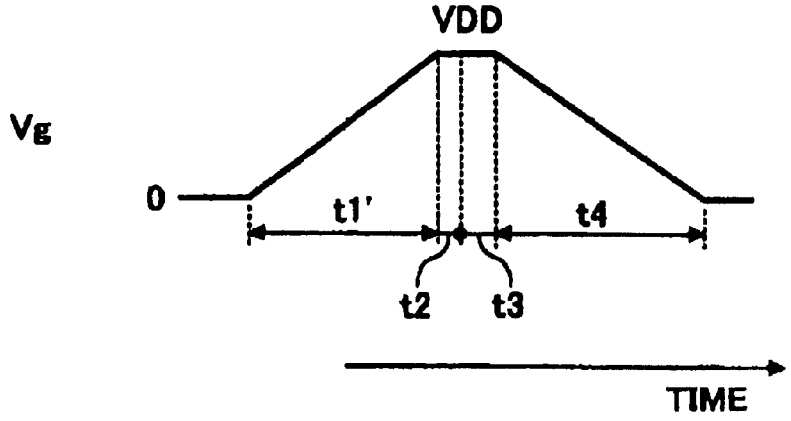
FIG. 11 is a time chart for showing another example of the gate voltage Vg relative to the N-MOS transistor of the undershooting preventive circuit.

It should be noted that FIG. 10 shows a case in which the current control circuit 83 receives a high signal from the operational amplifier 82 before the gate voltage Vg is raised to a level of the power source voltage VDD after the predetermined time t1 following the application of the gate voltage Vg to the N-MOS transistor 81. On the other hands, when the current control circuit 83 raises the gate voltage Vg to the level of the power source voltage VDD upon receiving a high signal from the operational amplifier 82, the gate voltage Vg changes in a way as shown in FIG. 11. In FIG. 11, a predetermined time t1' is equivalent to the predetermined time t1 of FIG. 10 but is relatively longer than the predetermined time t1, and the current control circuit 83 attempts to raise the gate voltage Vg during the predetermined time t2. At this time, however, the gate voltage Vg is raised to the level of the power source voltage VDD and, as a result, the gate voltage Vg is held at the level of the power source voltage VDD during the predetermined times t2 and t3.

The current control circuit 83 is previously provided with various kinds of settings associated with the gate voltage of the N-MOS transistor 81 so that the voltage regulator 3 starts its operation and the load current IOU flows from the smoothing circuit 32 through the voltage regulator 3 during the time the current control circuit 83 reduces the gate voltage of the N-MOS transistor 81 to ground level. More specifically, the above-mentioned various kinds of settings includes the voltage raising pace of the gate voltage Vg of the N-MOS transistor 81, the predetermined times t2 and t3 in which the gate voltage Vg is held at the level of the power source voltage VDD, and the pace of reducing the gate voltage Vg from the level of the power source voltage VDD to the ground level.

The overshoot preventive circuit 63 is in an inactive state and maintains the output terminal at an open state in the normal operation mode. Accordingly, the overshoot preventive circuit 63 stops applying a gate voltage to the P-MOS transistor 41. In the sleep mode, the overshoot preventive circuit 63 is turned into an active state and detects a current output from the P-MOS transistor 41. Therefore, the overshoot preventive circuit 63 controls the gate voltage of the P-MOS transistor 41 in accordance with the result of the current detection.

During the sleep mode, the overshoot preventive circuit 63 raises the voltage Vo to the level of the power source voltage VDD by making the gate voltage of the P-MOS transistor 41 low to turn on the P-MOS transistor 41 when the detected current is smaller than a predetermined value α (e.g., 1A). When the detected current is greater than the predetermined value α (e.g., 1A), the overshoot preventive circuit 63 continuously raises the gate voltage of the P-MOS transistor 41 in response to the detected current so that the current supplied from the P-MOS transistor 41 is successively reduced to the level smaller than the predetermined value α (e.g., 1A).

Figure 12:
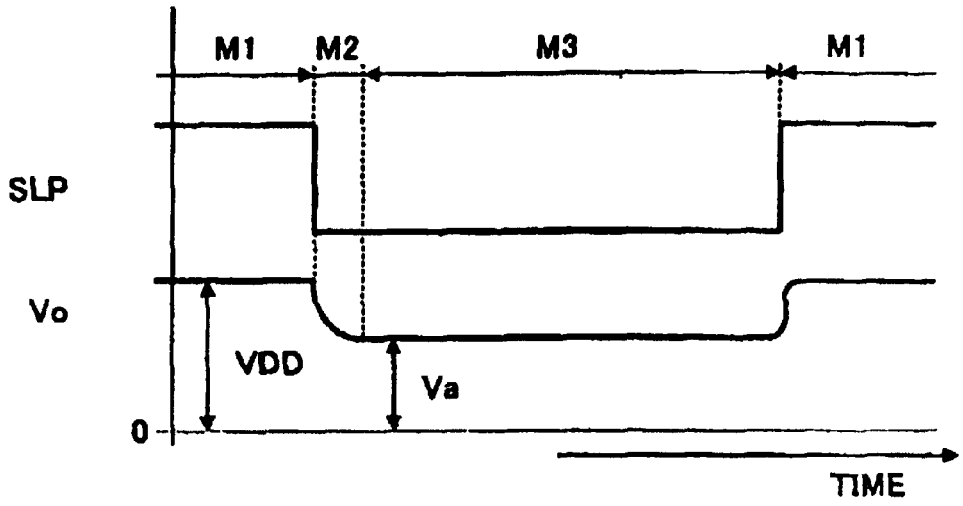
FIG. 12 is a time chart for showing an example of the output voltage Vo output by the DC-to-DC converter of FIG. 7.

When the above-described operations are performed, the voltage Vo is changed in a way as shown in FIG. 12. As a result, the voltage Vo can be prevented from the undershooting during the time the mode is changed from the sleep mode to the normal operation mode and from the overshooting during the time the mode is changed from the normal operation mode to the sleep mode. In addition, the overshoot preventive circuit 63 also prevents an excessive current flowing from the P-MOS transistor 41 in the sleep mode when a short circuit occurs in a load connected to the smoothing circuit 32. With this, the power supply apparatus 1 can prevent an excessive current output from the DC-to-DC converter 2 in the sleep mode.

Figure 13:
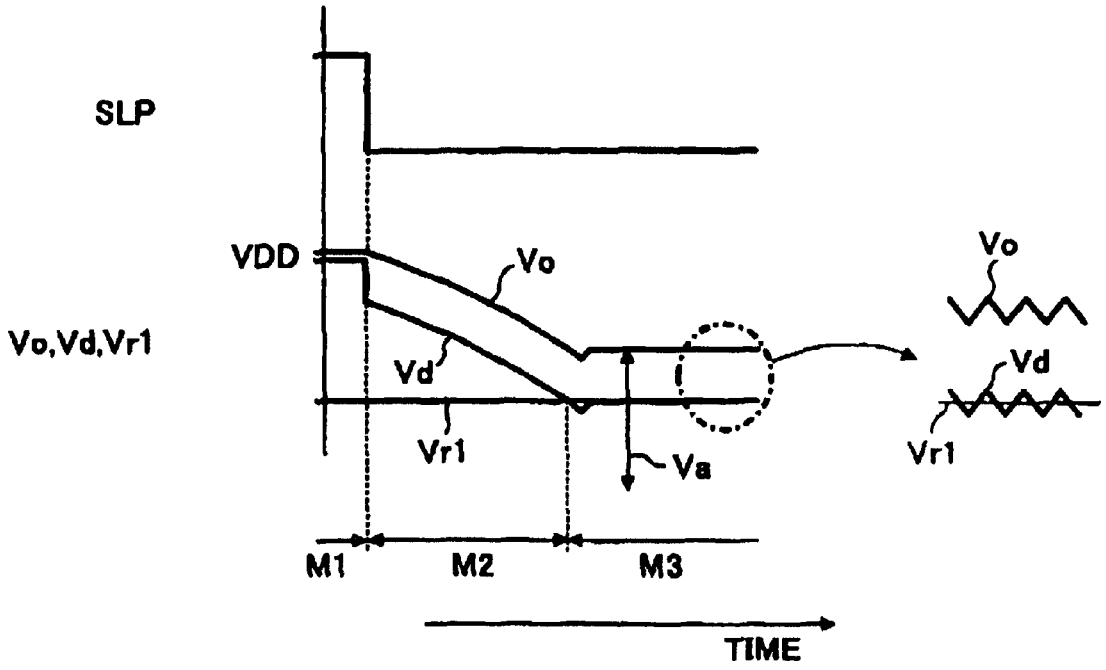
FIG. 13 is a time chart for explaining a relationship among the voltage Vo, a divided voltage Vd, and a reference voltage Vr1 generated in the DC-to-DC converter of FIG. 7.

As described above, in the DC-to-DC converter 302 of FIG. 7, the reference voltage Vr1 and the divided voltage Vd are compared by the operational amplifier 73 of the voltage detection circuit 71 and the duty controller 72 generates a pulse signal that has a duty cycle in response to the comparison result and applies the pulse signal to the gate of the P-MOS transistor 41. In this case, relationships among the voltage Vo, the divided voltage Vd, and the reference voltage Vr1 are as shown in FIG. 13, in which a portion enclosed with a chain line is shown in an enlarged form. FIG. 13 indicates that the DC-to-DC converter 302 prevents the voltage Vo from undershooting through the voltage Vo may still be dropped to a level slightly lower than the predetermined voltage Va since the DC-to-DC converter 302 is fell into an inactive-like state during the time the mode is changed from the sleep mode to the normal operation mode.

Figure 14:
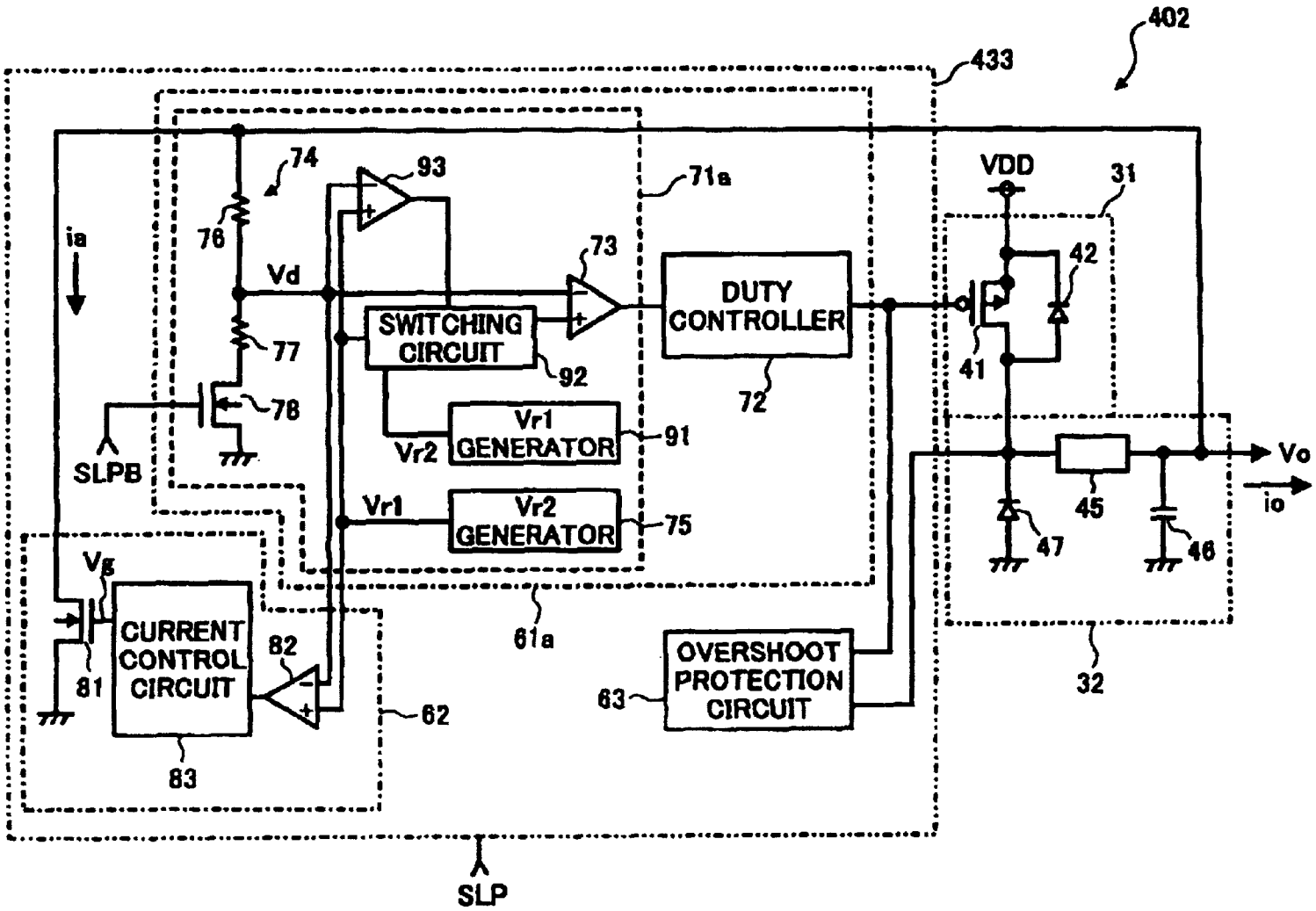
FIG. 14 is a circuit diagram of another DC-to-DC converter according to a preferred embodiment.

FIG. 14 shows a DC-to-DC converter 402 according to another preferred embodiment. The DC-to-DC converter 402 can be used as an alternative to the DC-to-DC converter 302 of FIG. 7 and is similar to it, except for a control circuit 433. This control circuit 433 can be used in place of the control circuit 233 of the DC-to-DC converter 202, as a further alternative. In FIG. 14, connections of the sleep signal SLP to each component inside the control circuit 433 are not shown for the sake of simplicity.

The controller 433 of FIG. 14 is similar to the controller 333 of FIG. 7, except for additional circuits of a Vr2 generator 91, a selection circuit 92, and an operational amplifier 93 to the voltage detection circuit 71 of FIG. 7. The Vr2 generator 91 generates and outputs a reference voltage Vr2. The selection circuit 92 exclusively selects one of the reference voltages Vr1 and Vr2 in accordance with a control signal and inputs the selected reference voltage to the operational amplifier 73. The operational amplifier 93 controls the operation of the selection circuit 92 in accordance with the divided voltage Vd. Accordingly, in FIG. 14, a duty control circuit 61a replaces the duty control circuit 61 of FIG. 7 and a voltage detection circuit 71a replaces the voltage detection circuit 71 of FIG. 7.

As shown in FIG. 14, the controller 433 includes the duty control circuit 61a, the undershoot preventive circuit 62, and the overshoot preventive circuit 63. The duty control circuit 61a includes the voltage detection circuit 71a and the duty controller 72. The voltage detection circuit 71a detects the voltage Vo, and the duty controller 72 controls the duty cycle of a pulse signal input to the gate of the P-MOS transistor 41 in response to the voltage Vo detected by the voltage detection circuit 71a.

The voltage detecting circuit 71a includes the operational amplifier 73, the voltage dividing circuit 74, the Vr1 generator 75, the Vr2 generator 91, the selection circuit 92, and the operational amplifier 93. In the sleep mode, as in the case of the voltage detection circuit 71 of FIG. 7, the operational amplifier 73 and the Vr1 generator 75 are caused to stop the respective operations, and the voltage dividing circuit 74 dividing the voltage Vo to a voltage Vd outputs the divided voltage Vd. Also, the Vr2 generator 91, the selection circuit 92, and the operational amplifier 93 are caused to stop the respective operations.

Each part of the voltage detection circuit 71a starts to operate when the mode is changed from the sleep mode to the normal operation mode. The Vr2 generator 91 generates the reference voltage Vr2 and varies it at a predetermined pace such that the reference voltage Vr2 is reduced from a predetermined voltage Vx lower than the divided voltage Vd to the reference voltage Vr1 in a predetermined time period when the mode is changed from the sleep mode to the normal operation mode.

The operational amplifier 93 performs a comparison between the divided voltage Vd and the reference voltage Vr1, and outputs a low level control signal to the selection circuit 92 when the divided voltage Vd is determined as greater than the reference voltage Vr1. The selection circuit 92 inputs the reference voltage Vr2 to a non-inverse input terminal of the operational amplifier 73 upon receiving the low level control signal from the operational amplifier 93. On the other hands, the operational amplifier 93 outputs a high level control signal to the selection circuit 92 when the divided voltage Vd is determined as smaller than the reference voltage Vr1. The selection circuit 92 inputs the reference voltage Vr1 to the non-inverse input terminal of the operational amplifier 73 upon receiving the high level control signal from the operational amplifier 93.

Figure 15:
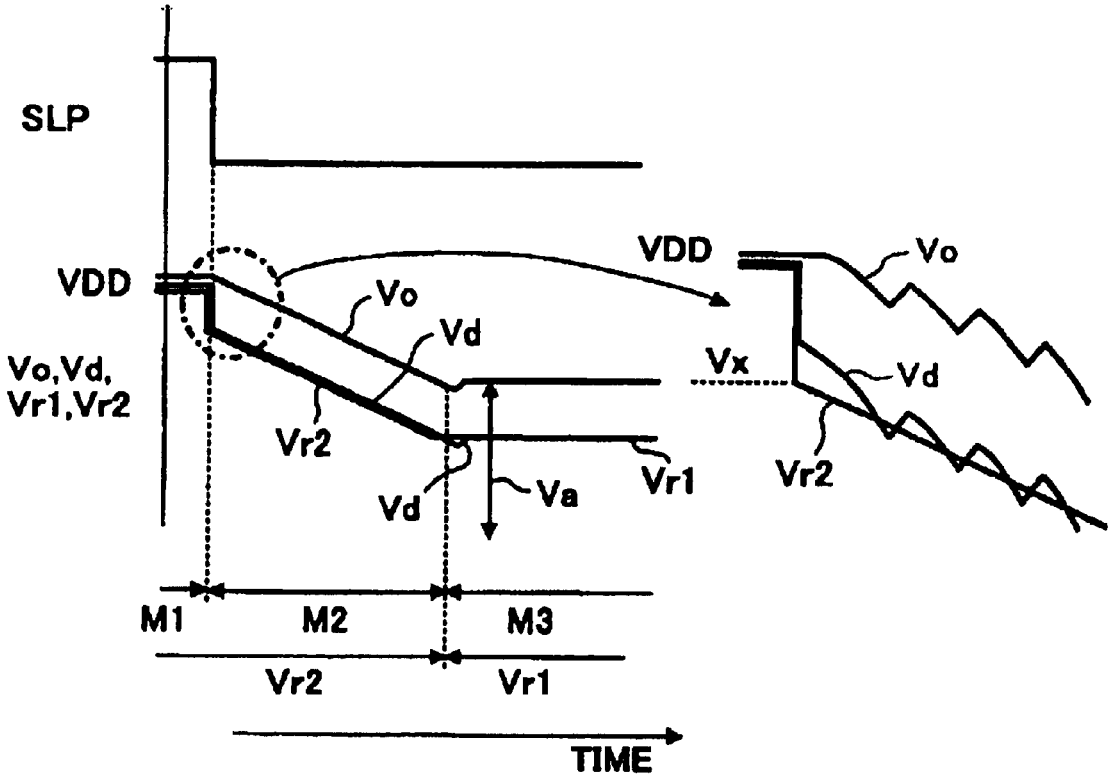
FIG. 15 is a time chart for explaining a relationship among a voltage Vo, a divided voltage Vd, and a reference voltage Vr1 generated in the DC-to-DC converter of FIG. 14.

With the above-described operations, the voltage Vo, the divided voltage Vd, and the reference voltage Vr2 are varied in a way as shown in FIG. 15, in which a portion enclosed with a chain line is shown in an enlarged form. FIG. 15 indicates that the DC-to-DC converter 402 prevents the voltage Vo from undershooting, which is a problematic phenomenon that the voltage Vo is dropped to a level lower than the predetermined voltage Va at a time the DC-to-DC converter 402 bears a sudden load, since the DC-to-DC converter 402 is in an active state during the time the mode is changed from the sleep mode to the normal operation mode. The reference voltage Vr2 may be controlled to be declined so that the voltage Vo is reduced at a pace slower than the case shown in FIG. 15.

In this way, the DC-to-DC converter 402 can prevent the voltage Vo from undershooting and overshooting with the undershoot preventive circuit 62 and the overshoot preventive circuit 63, respectively. The DC-to-DC converter 402 further prevents the voltage Vo from undershooting when the mode is changed from the sleep mode to the normal operation mode by the arrangement that the duty control circuit 61a uses the reference voltage Vr2 which is generated and varied by the Vr2 generator 91 at the predetermined pace such that the reference voltage Vr2 is reduced from a predetermined voltage Vx lower than the divided voltage Vd to the reference voltage Vr1 in the predetermined time period when the mode is changed from the sleep mode to the normal operation mode.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent applications, No. JPAP2001-038394 filed on Feb. 15, 2001 and No. JPAP2001-189792 filed on Jun. 22, 2001 in the Japanese Patent Office, the entire contents of which are incorporated by reference herein.

What is claimed is:

1. A power supply apparatus, comprising:

a DC-to-DC converter-for-converting a voltage of a power source supplied from a direct current power source to a first predetermined voltage, said, first predetermined voltage being lower than said voltage of said power source; and a voltage regulator for regulating said first predetermined voltage to at least a second predetermined voltage, said second predetermined voltage being lower than said first predetermined voltage, wherein said DC-to-DC converter is turned into a non-active state to stop said voltage conversion and passes said voltage of said power source when an operation mode is changed to a sleep mode.

2. The power supply apparatus of claim 1, wherein said DC-to-DC converter comprises:

a switching circuit arranged and configured to perform a switching operation for switching said power source and to output a pulsating current voltage;

a smoothing circuit configured to smooth said pulsating current voltage output by said switching circuit and to output a smoothed voltage to said voltage regulator; and a controller configured to detect said smoothed voltage output from said smoothing circuit and to control said switching circuit to change a performance of said switching operation in response to a detection result of said smoothed voltage so that said smoothed voltage output by said smoothing circuit is substantially equal to said first predetermined voltage, wherein said controller is turned into a non-active state to cause said switching circuit to stop said switching operation so as to pass said voltage of said power source through said switching circuit and to output said voltage of said power source to said smoothing circuit when said operation mode is changed to said sleep mode.

3. A power supply apparatus, comprising:

a DC-to-DC converter for converting a voltage of a power source supplied from a direct current power source to a first predetermined voltage, said first predetermined voltage being lower than said voltage of said power source; and a voltage regulator for regulating said first predetermined voltage to at least a second predetermined voltage, said second predetermined voltage being lower than said first predetermined voltage, wherein said DC-to-DC converter outputs said voltage of said power source without performing said voltage conversion when an operation mode is changed to a sleep mode.

4. The power supply apparatus of claim 3, wherein said converter comprises:

a switching circuit for switching said power source and outputting a pulsating current voltage;

a smoothing circuit for smoothing said pulsating current voltage output from said switching circuit and to output a smoothed voltage to said voltage regulator; and a controller configured to detect said smoothed voltage output from said smoothing circuit and to control said switching circuit to change said switching operation in response to a detection result of said smoothed voltage so that said smoothed voltage output from said smoothing circuit is substantially equal to said first predetermined voltage, wherein said controller causes said switching circuit to stop said switching operation so as to pass said voltage of said power source through said switching circuit and to output said voltage of said power source to said smoothing circuit when said operation mode is changed to said sleep mode.

5. The power supply apparatus of claim 4, wherein said controller connects a load to an output terminal of said smoothing circuit and controls a current flowing from said load so as to reduce said voltage output from said smoothing circuit to said first predetermined voltage when said voltage output from said smoothing circuit is lower than said first predetermined voltage and when said operation mode is changed to a normal operation mode.

6. The power supply apparatus of claim 5, wherein said controller comprises:

a transistor which operates as said load;

a comparator for comparing said voltage output from said smoothing circuit with said first predetermined voltage when said operation mode is changed to said normal operation mode and outputs a first comparison result; and a current control circuit configured to control said transistor to produce a current flowing therethrough in response to said first comparison result of said comparator when said operation mode is changed to said normal operation mode.

7. The power supply apparatus of claim 6, wherein said current control circuit controls said transistor to increase said current at a first predetermined pace when said voltage output from said smoothing circuit is determined as greater than said first predetermined voltage based on said first comparison result performed by said comparator.

8. The power supply apparatus of claim 6, wherein said current control circuit controls said transistor to continue to increase said current at said first predetermined pace for a first predetermined time period when said voltage output from said smoothing circuit is determined as substantially equal to said first predetermined voltage based on said first comparison result performed by said comparator, and controls said transistor to produce a saturated current flowing therethrough for a second predetermined time period immediately after said first predetermined time period.

9. The power supply apparatus of claim 8, wherein said current control circuit controls said transistor to decrease said current at a second predetermined pace for a third predetermined time period immediately after said second predetermined time period.

10. The power supply apparatus of claim 4, wherein said controller detects a current output from said switching circuit and controls said switching circuit to vary said current in response to said detected current when said operation mode is changed to said sleep mode.

11. The power supply apparatus of claim 10, wherein said controller controls said switching circuit to straight output said voltage of said power source to said smoothing circuit when said current detected is smaller than a predetermined value and to reduce said current output therefrom to a value smaller than said predetermined value in a predetermined manner when said current is greater than said predetermined value.

12. The power supply apparatus of claim 4, wherein said controller performs a second comparison between a reference voltage dropping at a substantially constant pace and said voltage output from said smoothing circuit in response to said detected voltage and, according to a result of said second comparison, controls a duty cycle of said switching operation performed by said switching circuit during a time said voltage output from said smoothing circuit is reduced to said first predetermined voltage, when said operation mode is changed to said normal operation mode.

13. The power supply apparatus of claim 12, wherein said controller performs a third comparison between another predetermined reference voltage and said voltage output from said smoothing circuit in response to said detected voltage and, according to a result of said third comparison, controls a duty cycle of said switching operation performed by said switching circuit when said voltage output from said smoothing circuit is reduced to said first predetermined voltage.

14. A power supply apparatus, comprising:

converting means for performing a DC-to-DC conversion for converting a voltage of a power source supplied from a direct current power source to a first predetermined voltage, said first predetermined voltage being lower than said voltage of said power source; and regulating means for carrying out a voltage regulation for regulating said first predetermined voltage to at least a second predetermined voltage, said second predetermined voltage being lower than said first predetermined voltage, wherein said converting means is turned into a non-active state to stop said voltage conversion and straight passes said voltage of said power source when an operation mode is changed to a sleep mode.

15. The power supply apparatus of claim 14, wherein said converting means comprises:

switching means for switching said power source and outputting a pulsating current voltage;

smoothing means for smoothing said pulsating current voltage output by said switching means and to output a smoothed voltage to said regulating means; and controlling means for detecting said smoothed voltage output from said smoothing means and to control said switching means to change a performance of said switching operation in response to a detection result of said smoothed voltage so that said smoothed voltage output by said smoothing means is substantially equal to said first predetermined voltage, wherein said controlling means is turned into a non-active state to cause said switching means to stop said switching operation so as to pass said voltage of said power source through said switching means and to output said voltage of said power source to said smoothing means when said operation mode is changed to said sleep mode.

16. A power supply apparatus, comprising:

converting means for performing a DC-to-DC conversion for converting a voltage of a power source supplied from a direct current power source to a first predetermined voltage, said first predetermined voltage being lower than said voltage of said power source; and regulating means for carrying out a voltage regulation for regulating said first predetermined voltage to at least a second predetermined voltage, said second predetermined voltage being lower than said first predetermined voltage, wherein said converting means outputs said voltage of said power source without performing said voltage conversion when an operation mode is changed to a sleep mode.

17. The power supply apparatus of claim 16, wherein said converting means comprises:

switching means for switching said power source and outputting a pulsating current voltage;

smoothing means for smoothing said pulsating current voltage output from said switching means and to output a smoothed voltage to said regulating means; and controlling means for detecting said smoothed voltage output from said smoothing means and to control said switching means to change a performance of said switching operation in response to a detection result of said smoothed voltage so that said smoothed voltage output from said smoothing means is substantially equal to said first predetermined voltage, wherein said controlling means causes said switching means to stop said switching operation so as to pass said voltage of said power source through said switching means and to output said voltage of said power source to said smoothing means when said operation mode is changed to said sleep mode.

18. The power supply apparatus of claim 17, wherein said controlling means connects a load to an output terminal of said smoothing means and controls a current flowing through said load so as to reduce said voltage output from said smoothing means to said first predetermined voltage when said voltage output from said smoothing means is lower than said first predetermined voltage and when said operation mode is changed to a normal operation mode.

19. The power supply apparatus of claim 18, wherein said controlling means comprising:

a transistor which operates as said load;

comparing means for performing a first comparison for comparing said voltage output from said smoothing means with said first predetermined voltage when said operation mode is changed to said normal operation mode and outputs a first comparison result; and current controlling means controlling said transistor to produce a current flowing therethrough in response to said first comparison result of said comparing means when said operation mode is changed to said normal operation mode.

20. The power supply apparatus claim 19, wherein said current controlling means controls said transistor to increase said current at a first predetermined pace when said voltage output from said smoothing means is determined as greater than said first predetermined voltage based on said first comparison result performed by said comparing means.

21. The power supply apparatus of claim 19, wherein said current controlling means controls said transistor to continue to increase said current at said first predetermined pace for a first predetermined time period when said voltage output from said smoothing means is determined as substantially equal to said first predetermined voltage based on said first comparison result performed by said comparing means, and controls said transistor to produce a saturated current flowing therethrough for a second predetermined time period immediately after said first predetermined time period.

22. The power supply apparatus of claim 21, wherein said current controlling means controls said transistor to decrease said current at a second predetermined pace for a third predetermined time period immediately after said second predetermined time period.

23. The power supply apparatus of claim 17, wherein said controlling means detects a current output from said switching means and controls said switching means to vary said current in response to said detected current when said operation mode is changed to said sleep mode.

24. The power supply apparatus of claim 23, wherein said controlling means controls said switching means to straight output said voltage of said power source to said smoothing means when said current detected is smaller than a predetermined value and to reduce said current output therefrom to a value smaller than said predetermined value in a predetermined manner when said current is greater than said predetermined value.

25. The power supply apparatus of claim 17, wherein said controlling means performs a second comparison between a reference voltage dropping at a substantially constant pace and said voltage output from said smoothing means in response to said detected voltage and, according to a result of said second comparison, controls a duty cycle of said switching operation performed by said switching means during a time said voltage output from said smoothing means is reduced to said first predetermined voltage, when said operation mode is changed to said normal operation mode.

26. The power supply apparatus of claim 25, wherein said controlling means performs a third comparison between another predetermined reference voltage and said voltage output from said smoothing means in response to said detected voltage and, according to a result of said third comparison, controls a duty cycle of said switching operation performed by said switching means when said voltage output from said smoothing means is reduced to said first predetermined voltage.

27. A method of supplying, comprising the steps of:

DC-to-DC converting a voltage of a power source supplied from a direct current power source to a first predetermined voltage, said first predetermined voltage being lower than said voltage of said power source;

regulating said first predetermined voltage to at least a second predetermined voltage, said second predetermined voltage being lower than said first predetermined voltage; and stopping said DC-to-DC conversion and passing said voltage of said power source straight through from a DC-to-DC converter to a voltage regulator when an operation mode is changed to a sleep mode.

28. The method of claim 27, wherein said stopping step comprises the steps of:

executing a switching operation for switching said power source to output a pulsating current voltage;

smoothing said pulsating current voltage output by said switching circuit to output a smoothed voltage to said voltage regulator;

detecting said smoothed voltage output in said smoothing step;

changing a performance of said switching operation in response to a detection result of said smoothed voltage so that said smoothed voltage output in said smoothing step is substantially equal to said first predetermined voltage; and stopping said switching operation when said operation mode is changed to said sleep mode so as to apply said voltage of said power source to said smoothing circuit.

29. A method of supplying power, comprising the steps of:

DC-to-DC converting a voltage of a power source supplied from a direct current power source to a first predetermined voltage, said first predetermined voltage being lower than said voltage of said power source;

regulating said first predetermined voltage to at least a second predetermined voltage, said second predetermined voltage being lower than said first predetermined voltage; and outputting said voltage of said power source without performing said DC-to-DC converting step when an operation mode is changed to a sleep mode.

30. The method of claim 29, wherein said outputting step comprises the steps of:

executing a switching operation for switching said power source to output a pulsating current voltage;

smoothing said pulsating current voltage output in said switching step to output a smoothed voltage to a voltage regulator;

detecting said smoothed voltage output in said smoothing step;

changing a performance of said switching operation in response to a detection result of said smoothed voltage so that said smoothed voltage output in said smoothing step is substantially equal to said first predetermined voltage; and stopping said switching operation when said operation mode is changed to said sleep mode so as to apply said voltage of said power source to said smoothing circuit.

31. The method of claim 30, further comprising the steps of:

detecting a current output in said switching step when said operation mode is changed to said sleep mode; and instructing said switching step to change said current in response to said detected current.

32. The method of claim 31, wherein said instructing step instructs said switching step to straight output said voltage of said power source to said smoothing step when said current detected is smaller than a predetermined value and to reduce said current output in said switching step to a value smaller than said predetermined value in a predetermined manner when said current is greater than said predetermined value.

33. The method of claim 30, further comprising the steps of:

performing a second comparison between a reference voltage dropping at a substantially constant pace and said voltage output in said smoothing step in response to said detected voltage during a time said voltage output in said smoothing step is reduced to said first predetermined voltage; and determining a duty cycle of said switching operation performed in said switching step according to a result of said second comparison.

34. The method of claim 33, further comprising the steps of:

performing a third comparison between another predetermined reference voltage and said voltage output in said smoothing circuit in response to said detected voltage; and controlling said duty cycle of said switching operation performed in said switching step according to a result of said third comparison when said voltage output in said smoothing step is reduced to said first predetermined voltage.

35. The method of claim 29, further comprising the steps of:

providing a transistor as a load;

applying said voltage output in said smoothing step to said transistor so that a current flows through said transistor when said voltage output in said smoothing step is lower than said first predetermined voltage and when said operation mode is changed to a normal operation mode; and adjusting said current flowing said load so as to reduce said voltage output in said smoothing step to said first predetermined voltage.

36. The method of claim 35, wherein said adjusting step comprises the steps of:

performing a first comparison for comparing said voltage output in said smoothing step with said first predetermined voltage when said operation mode is changed to said normal operation mode to output a first comparison result; and causing said transistor to produce a current flowing therethrough in response to said first comparison result of said comparing step when said operation mode is changed to said normal operation mode.

37. The method of claim 36, wherein said causing step causes said transistor to increase said current at a first predetermined pace when said voltage output in said smoothing step is determined as greater than said first predetermined voltage based on said first comparison result performed in said comparing step.

38. The method of claim 36, wherein said causing step causes said transistor to continue to increase said current at said first predetermined pace for a first predetermined time period when said voltage output in said smoothing step is determined as substantially equal to said first predetermined voltage based on said first comparison result performed in said comparing step, and causes said transistor to produce a saturated current flowing therethrough for a second predetermined time period immediately after said first predetermined time period.

39. The method of claim 38, wherein said causing step causes said transistor to decrease said current at a second predetermined pace for a third predetermined time period immediately after said second predetermined time period.

*40. A power supplying circuit, comprising:*

*a voltage regulator configured to output a desired output voltage; and*

*a DC-to-DC converter for converting a voltage of a power source, the DC-to-DC converter including*

*a switching circuit configured to perform a switching with an input of the power source voltage and to output a specific voltage,*

*a smoothing circuit configured to smooth the specific voltage and to output a smoothed specific voltage to the voltage regulator, and*

*a control circuit configured to detect the smoothed specific voltage output from the smoothing circuit and to control the switching circuit in accordance with a result of detecting the smoothed specific voltage such that the smoothed specific voltage is substantially equal to a predetermined voltage, the control circuit being deactivated when receiving a control signal and causing the switching circuit to stop performing the switching so that the power source voltage is supplied to the smoothing circuit,*

*wherein said DC-to-DC converter is turned into a non-active state to stop said voltage conversion and passes said voltage of said power source when an operation mode is changed to a sleep mode.*

*41. A DC-to-DC converter for use in a power supply apparatus, comprising:*

*a sleep signal input circuit configured to input a sleep signal;*

*a MOS transistor; and*

*a control circuit configured to control a switching operation of the MOS transistor,*

*wherein an input level of the sleep signal of the sleep signal input circuit is changed according to a status whether an apparatus receiving a power from the power supply apparatus is in operation, and*

*wherein the control circuit changes its output according to the input level of the sleep signal to have a mode in which an input voltage is reduced at a stage of an output and another mode in which the input voltage appears at the stage of the output with the MOS transistor continuously turned on.*

*42. A system apparatus, comprising:*

*a power supply circuit including a DC-to-DC converter that includes*

*a sleep signal input circuit configured to input a sleep signal;*

*a MOS transistor; and*

*a control circuit configured to control a switching operation of the MOS transistor,*

*wherein an input level of the sleep signal of the sleep signal input circuit is changed according to a status whether an apparatus receiving a power from the supply apparatus is in operation, and*

*wherein the control circuit changes its output according to the input level of the sleep signal to have a mode in which an input voltage is reduced at a stage of an output and another mode in which the input voltage appears at the stage of the output with the MOS transistor continuously turned on.*

* * * * *